United States Patent

Diamantoglou et al.

Patent Number: 5,087,366
Date of Patent: Feb. 11, 1992

[54] BIOCOMPATIBLE DIALYSIS MEMBRANE COMPRISING A MIXED POLYSACCHARIDE ESTER

[75] Inventors: Michael Diamantoglou, Erlenbach/Main; Hans Georg Tilgner, Mülheim/Ruhr, both of Fed. Rep. of Germany

[73] Assignee: Akzo N.V., Arnhem, Netherlands

[21] Appl. No.: 453,797

[22] Filed: Dec. 20, 1989

[51] Int. Cl.$^5$ .............................................. B01D 61/26
[52] U.S. Cl. ......................... 210/500.23; 210/500.29; 210/500.38
[58] Field of Search ........... 210/500.1, 500.21, 500.22, 210/500.23, 500.24, 500.27, 500.28–500.32, 500.37–500.39; 527/200

[56] References Cited

U.S. PATENT DOCUMENTS 4,898,921 6/1987 Humphrey et al. ................. 527/200

Primary Examiner—Frank Sever
Attorney, Agent, or Firm—Oliff & Berridge

[57] ABSTRACT

A biocompatible dialysis membrane for hemodialysis in the form of flat sheets, tubular sheets or hollow filaments is disclosed. The dialysis membrane comprises a mixed polysaccharide ester of acetic acid, and/or propionic acid and/or butyric acid and has a structure represented by the formula

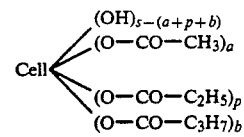

wherein Cell denotes the skeleton of the polysaccharide molecule without hydroxyl groups; a, b, p, and s are numbers wherein s is a maximum degreee of substitution and the following equations are satisfied:

$a+p+b=(0.5)(s)$ to $(0.95)(s)$
$p+b=(0.13)(s)$ to $(0.95)(s)$;
$a=(0$ to $0.83)(s)$;
$b=(0$ to $0.9)(s)$; and
$p=(0$ to $0.9)(s)$ with the provision that, if $a=0$, then p and b must be greater than 0 and, if p or $b=0$, then a must be greater than 0.

13 Claims, No Drawings

BIOCOMPATIBLE DIALYSIS MEMBRANE COMPRISING A MIXED POLYSACCHARIDE ESTER

BACKGROUND OF THE INVENTION

The invention relates to a biocompatible dialysis membrane for hemodialysis in the form of flat sheets, tubular sheets or hollow filaments, comprising a mixed polysaccharide ester of acetic acid and/or propionic acid and/or butyric acid.

Mixed polysaccharide esters are already known and described in detail in, for example, Kirk-Othmer, "Encyclopedia of Chemical Technology", 2nd Ed., 1964, Vol. 3, pp. 325 ff. Heretofore they have been employed as thermoplastic plastics and in the production of lacquers.

From Japanese Laid-open Application 57-133,211 it is known how to spin cellulose esters such as cellulose diacetate or triacetate, cellulose propionate, cellulose butyrate, cellulose acetate propionate, cellulose acetate butyrate to hollow filaments which are suitable for the purification of body fluids by ultrafiltration and dialysis. Their compatibility with blood is excellent.

The biocompatibility of dialyzers is influenced by numerous factors, of which only one is the membrane, a fact that must not be disregarded in an analysis of the biocompatibility.

Although several biocompatibility parameters with clinical relevance have already been discussed, uncertainties still exist as regards the laboratory values. An important factor in the framework of evaluation of the biocompatibility is the thrombogenicity. Cellulosic membranes are known to have low thrombogenicity, while the thrombogenicity of known cellulose acetate membranes is being seriously evaluated.

In addition to the circumstance that dialysis membranes consisting of synthetic or natural polymers can, during their employment in artificial kidneys, very easily cause coagulation of the blood, which is largely prevented by appropriate drug treatment, there occurs, in the treatment of a kidney patient with dialyzers that contain membranes consisting of regenerated cellulose, a temporary leukocyte decrease in the initial period of the dialysis treatment. This effect is known as leukopenia.

Leukopenia is a lowering of the leukocyte count (white blood corpuscles) in the bloodstream. The number of white blood corpuscles in humans is about 4,000 to 12,000 cells/mm$^3$.

The leukopenia during dialysis is most strongly pronounced 15 to 20 minutes after the start of the treatment, the neutrophils (which are the leukocytes that can be stained with neutral or simultaneously with acid and basic dyes) being able to disappear almost completely. Thereafter the number of leukocytes recovers to almost the initial value or exceeds it within approximately one hour.

If a new dialyzer is connected after recovery of the leukocytes, leukopenia takes place again to the same extent.

Cellulose membranes cause pronounced leukopenia and cellulose ester membranes cause somewhat less pronounced leukopenia. Although the clinical significance of leukopenia has not been scientifically explained, the wish nevertheless exists for a dialysis membrane for hemodialysis which does not exhibit the effect of leukopenia, without the other greatly desired properties of dialysis membranes being impaired thereby.

In hemodialysis by means of membranes consisting of cellulose and cellulose esters, distinct complement activation has been observed in addition to the leukopenia. The complement system in the blood serum is a complex plasma enzyme system which consists of many components and which acts in various ways in the defense against injuries due to invading foreign cells (bacteria, etc.). If antibodies against the invading organism are present, the antibody with antigenic structures of the foreign cells can be activated in complement specific manner by the complex, otherwise the complement activation takes place by an alternative pathway due to special surface features of the foreign cells. The complement system depends on a large number of plasma proteins. After activation, these proteins react specifically with each other in a particular sequence, and ultimately a cell-damaging complex is formed that destroys the foreign cell.

From individual components there are released peptides, which trigger inflammatory phenomena and sometimes also can have adverse pathological consequences for the organism. It is assumed that the activation in hemodialysis membranes takes place via the alternative pathway. These complement activations are objectively observed by determination of the C3a and C5a complement fragments.

In this connection, reference is made to the following papers: D.E. Chenoweth et al., Kidney International, Vol. 24, page 764 ff., 1983, and D.E. Chenoweth, Asaio-Journal, Vol. 7, page 44 ff., 1984.

Since for cellulose ester membranes the complement activation, measured on the C$_{5a}$ fragment, is reduced by approximately 50% compared with that of regenerated cellulose membranes, methods have heretofore been searched for and found of reducing, by selective modification, the C$_{5a}$ fragment for membranes consisting of regenerated cellulose, and in this connection C$_{5a}$ reductions of up to 80% have been achieved.

An object of the present invention was to achieve a C$_{5a}$ reduction of 70% and more also for membranes comprising polysaccharide esters.

BRIEF SUMMARY OF THE INVENTION

The present invention relates to a biocompatible dialysis membrane for hemodialysis in the form of flat sheets, tubular sheets or hollow filaments, comprising a mixed polysaccharide ester, formed from at least two members of the group consisting of acetic acid, propionic acid and butyric acid, wherein said mixed polysaccharide ester has a structure represented by the formula

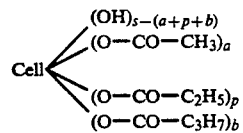

wherein Cell denotes the skeleton of the polysaccharide molecule without hydroxyl groups; a, b, p and s are numbers wherein s is a maximum degree of substitution and the following equations are satisfied:

$$a + p + b = (0.5)(s) \text{ to } (0.95)(s)$$
$$p + b = (0.13)(s) \text{ to } (0.95)(s);$$

-continued $a = (0 \text{ to } 0.83)(s);$
$b = (0 \text{ to } 0.9)(s);$ and
$p = (0 \text{ to } 0.9)(s);$ with the provision that, if $a=0$, then p and b must be greater than 0 and, if p or $b=0$, then a must be greater than 0.

DETAILED DESCRIPTION OF THE PREFERRED EMBODIMENTS

In a dialysis membrane of the invention, the mixed polysaccharide ester has a structure represented by the formula

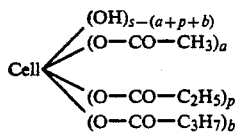

wherein Cell denotes the skeleton of the polysaccharide molecule without hydroxyl groups and wherein s is the maximum degree of substitution and the conditions of the equations $a + p + b = (0.5)(s) \text{ to } (0.95)(s)$     Equation 1)

$p + b = (0.13)(s) \text{ to } (0.95)(s)$     Equation 2)

$a = (0 \text{ to } 0.83)(s)$ are satisfied,     Equation 3)

and b or $p=(0 \text{ to } 0.9)(s)$ and p or b is obtained from Equations 1 to 3, with the provision that, if $a=0$, then p and b must be greater than 0 and, if p or $b=0$, then a must be greater than 0.

By the maximum degree of substitution s there is understood the number of hydroxyl groups that are accessible to substitution. For chitin $s=2$ and for cellulose $s=3$. In one embodiment of the invention the dialysis membrane is characterized in that the polysaccharide ester is an ester of acetic acid and of butyric acid, i.e., in the structural formula, $p=0$, $a=(0.03 \text{ to } 0.4)(s)$ and $b=(0.5 \text{ to } 0.9)(s)$.

In another embodiment of the invention, the dialysis membrane is characterized in that the polysaccharide ester is an ester of acetic acid and of butyric acid, i.e., in the structural formula, $p=0$, $a=(0.5 \text{ to } 0.8)(s)$ and $b=(0.1 \text{ to } 0.4)(s)$.

In a further embodiment of the invention, the dialysis membrane is characterized in that the polysaccharide ester is an ester of acetic acid and of propionic acid, i.e., in the structural formula, b 0, a $(0.02 \text{ to } 0.35)(s)$ and p $(0.4 \text{ to } 0.9)(s)$.

In another embodiment of the invention, the dialysis membrane is characterized in that the polysaccharide ester is an ester of acetic acid and of propionic acid, i.e., in the structural formula, b 0, a $(0.4 \text{ to } 0.7)(s)$ and p $(0.15 \text{ to } 0.45)(s)$.

In a further embodiment of the invention, the dialysis membrane is characterized in that the polysaccharide ester is an ester of acetic acid, propionic acid, and butyric acid and, in the structural formula, $a = (0.02 \text{ to } 0.5)(s);$
$p = (0.15 \text{ to } 0.6)(s);$ and
$b = (0.10 \text{ to } 0.5)(s).$ Preferred dialysis membranes according to the invention are obtained by being prepared by forming solutions of the polysaccharide ester in a solvent into a sheet, tubular sheet or into a hollow filament and precipitating them in a precipitation bath.

In one embodiment of the invention, aprotic solvents such as ketones, DMF, DMSO, DMAc, DMAc/LiCl or NMP/LiCl are preferred.

In another embodiment of the invention, formic acid and/or acetic acid, with addition of polyethylene glycol (PEG) and water if desired, are preferred as the solvent.

The excellent biocompatibility of the dialysis membrane according to the invention is also achieved if it contains from 1 to 50 weight percent, relative to the total mixture of the membrane, of a further polymer that is soluble in the used solvent. Chitin and/or polyacrylonitrile (PAN) and/or a polyamide are preferred as such polymers. The said polymers can be chemically modified if desired.

EXAMPLES

The following Examples illustrate the practice and advantages of the generic invention by reference to specific embodiments. As examples they are illustrative only, and are not intended to limit the scope of the generic invention in any manner whatsoever.

The complement activation was evaluated on the basis of the C5a fragment. For this purpose, 300 ml of heparinized blood plasma was recirculated in vitro for a period of 4 hours with a plasma flow of 100 ml/min through a dialyzer with 1 $m^2$ effective exchange area. In the plasma, the C5a fragments were determined by means of the RIA method (Upjohn test). The relative complement activation for the respective time of measurement was calculated by forming the ratio of the concentration at the time of sampling with the initial value in percent. The measured value after a recirculation time of 4 hours was used for the evaluation. Flat membranes are incubated with heparinized blood plasma for 3 hours and then the C5a fragments are determined.

EXAMPLE 1

By reaction of cellulose with acetic anhydride and propionic anhydride by a known procedure (see Kirk-Othmer, "Encyclopedia of Chemical Technology", 2nd Ed., 1964, Vol. 3, p. 332 ff.), a cellulose mixed ester with an acetyl group content of $a=1.36$ and a propionyl group content of $p=0.98$ was obtained.

The mixed ester was dissolved in a mixture of formic acid, polyethylene glycol 400 and water (78:15:7) and processed into flat membranes.

In comparison with unmodified cellulose membranes, the obtained cellulose mixed ester membranes exhibit no complement activation. Compared with the unmodified cellulose membrane, the $C_{5a}$ reduction is 100%.

EXAMPLE 2

By reaction of cellulose with acetic anhydride and propionic anhydride by a known procedure, cellulose 0.20 acetate 2.0 propionate was synthesized. This was mixed with cellulose 2.5 acetate, dissolved in a mixture of formic acid, polyethylene glycol 400 and water (74:18:8) and processed into flat membranes. The membranes exhibit the following specifications:

| | |
|---|---|
| acetyl group content: | a = 1.94 |
| propionyl group content: | p = 0.48 |

Compared with the unmodified cellulose membrane, the $C_{5a}$ reduction is 98%.

EXAMPLE 3

By reaction of cellulose with acetic anhydride and butyric anhydride by a known procedure, a cellulose mixed ester with an acetyl group content of $a=2.10$ and a butyryl group content of $6=0.75$ was synthesized.

The mixed ester was dissolved in a mixture of formic acid, polyethylene glycol 400 and water (74:18:8) and processed into flat membranes. Compared with the unmodified cellulose membrane, the $C_{5a}$ reduction is 95%.

EXAMPLE 4

By reaction of cellulose with acetic anhydride and butyric anhydride by a known procedure, cellulose 0.25 acetate 2.40 butyrate was prepared. The ester was dissolved in dimethylacetamide and processed into flat membranes. Compared with the unmodified cellulose membrane, the $C_{5a}$ reduction is 100%.

EXAMPLES 5 to 13

By analogy with Examples 1 to 4, the cellulose derivatives listed in Table 1 were prepared and processed into flat membranes, and their complement activation was examined.

TABLE 1

| Example No. | a | p | b | $C_{5a}$ reduction, % |
|---|---|---|---|---|
| 5 | 1.98 | 0.56 | 0 | 85 |
| 6 | 1.43 | 1.17 | 0 | 80 |
| 7 | 0.35 | 0 | 2.60 | 97 |
| 8 | 0.15 | 0 | 2.10 | 90 |
| 9 | 0.98 | 0 | 1.69 | 80 |
| 10 | 2.03 | 0 | 0.51 | 85 |
| 11 | 2.17 | 0 | 0.37 | 76 |
| 12 | 1.10 | 1.08 | 0.36 | 92 |
| 13 | 0 | 1.95 | 0.45 | 98 |

EXAMPLE 14

Cellulose 1.4 acetate 0.95 propionate prepared by a known method was mixed with polyacrylonitrile (50:50), dissolved in a mixture of dimethylacetamide and lithium chloride (93:7) and processed into flat membranes. Compared with the unmodified cellulose membrane, the $C_{5a}$ reduction is 100%.

EXAMPLE 15

A mixture of cellulose 1.94 acetate 0.48 propionate and chitin (50:50) was dissolved in dimethylacetamide/lithium chloride and processed into flat membranes. Compared with the unmodified cellulose membrane, the $C_{5a}$ reduction is 97%.

We claim:

1. A biocompatible dialysis membrane for hemodialysis in the form of flat sheets, tubular sheets or hollow filaments, comprising a mixed polysaccharide ester, formed from at least two members of the group consisting of acetic acid, propionic acid and butyric acid, wherein said mixed polysaccharide ester has a structure represented by the formula

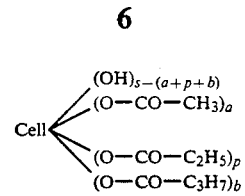

wherein Cell denotes the skeleton of the polysaccharide molecule without hydroxyl groups; a, b, p and s are numbers wherein s is a maximum degree of substitution and the following equations are satisfied:

$a + p + b = (0.5)(s)$ to $(0.95)(s)$;
$p + b = (0.13)(s)$ to $(0.95)(s)$;
$a = (0$ to $0.83)(s)$;
$b = (0$ to $0.9)(s)$; and
$p = (0$ to $0.9)(s)$, with the provision that, if $a=0$, then p and b must be greater than 0 and, if p or $b=0$, then a must be greater than 0 selected for providing a $C_{5A}$ reduction of about 70% or more.

2. The biocompatible dialysis membrane of claim 1, wherein said polysaccharide ester is an ester of acetic acid and butyric acid, wherein $p=0$, $a=(0.03$ to $0.4)(s)$ and $b=(0.5$ to $0.9)(s)$.

3. The biocompatible dialysis membrane of claim 1, wherein said polysaccharide ester is an ester of acetic acid and butyric acid, wherein $p=0$, $a=(0.5$ to $0.8)(s)$ and $b=(0.1$ to $0.4)(s)$.

4. The biocompatible dialysis membrane of claim 1, wherein said polysaccharide ester is an ester of acetic acid and propionic acid, $b=0$, $a=(0.02$ to $0.35)(s)$ and $p=(0.4$ to $0.9)(s)$.

5. The biocompatible dialysis membrane of claim 1, wherein said polysaccharide ester is an ester of acetic acid and propionic acid, $b=0$, $a=(0.4$ to $0.7)(s)$ and $p=(0.15$ to $0.45)(s)$.

6. The biocompatible dialysis membrane of claim 1, wherein said polysaccharide ester is an ester of acetic acid and propionic acid and butyric acid, and wherein $a = (0.02$ to $0.5)(s)$;
$p = (0.15$ to $0.6)(s)$; and
$b = (0.10$ to $0.5)(s)$.

7. The biocompatible dialysis membrane of claim 1, prepared by forming a solution fos aid polysaccharide ester in a solvent into a sheet, tubular sheet or a hollow filament and precipitating it in a precipitation bath.

8. The biocompatible dialysis membrane of claim 7, wherein an aprotic is used as said solvent.

9. The biocompatible dialysis membrane of claim 7, further comprising form 1 to 50 weight percent, relative to the total weight of the membrane, of a polymer that is soluble in said solvent.

10. The biocompatible dialysis membrane of claim 7, wherein formic acid or acetic acid is used as said solvent.

11. The biocompatible dialysis membrane of claim 9, wherein said solvent further contains PEG and water.

12. The biocompatible dialysis membrane of claim 10, wherein the polymer is selected from the group consisting of chitin, PAN and a polyamide.

13. The biocompatible dialysis membrane of claim 8, wherein said aprotic solvent is at least one member selected from the group consisting of ketone, DNF, DMSO, DMAc, DMAc/LiCl and NMP/LiCl.

* * * * *

UNITED STATES PATENT AND TRADEMARK OFFICE
CERTIFICATE OF CORRECTION

PATENT NO. : 5,087,366

DATED : February 11, 1992

INVENTOR(S) : Michael DIAMANTOGLOU et al

It is certified that error appears in the above-identified patent and that said Letters Patent is hereby corrected as shown below:

Col. 3, lines 61-62, change "b 0, a (0.4 to 0.7)(s) and p (0.15 to 0.45)(s)." to --b = 0, a = (.04 to 0.7)(s) and p = (0.15 to 0.45)(s).--

Col 5, line 15, change "6=0.75" to --b = 0.75--.

IN THE CLAIMS:

Claim 7, col. 6, line 47, change "fos aid" to --of said--.

Claim 13, col. 6, line 66, change "DNF," to --DMF,--.

Signed and Sealed this

Eighth Day of June, 1993

Attest:

MICHAEL K. KIRK

*Attesting Officer*  Acting Commissioner of Patents and Trademarks